July 21, 1942.  C. F. JOHNSON  2,290,332
VALVE
Filed July 9, 1940   2 Sheets-Sheet 1

Charles F. Johnson.
INVENTOR.
BY
ATTORNEYS

Patented July 21, 1942

2,290,332

UNITED STATES PATENT OFFICE 2,290,332

VALVE

Charles Francis Johnson, Houston, Tex., assignor to Reed Roller Bit Company, Houston, Tex., a corporation of Texas Application July 9, 1940, Serial No. 344,491

11 Claims. (Cl. 251—102)

This invention relates to valves and has for its general object the provision of a valve of the plug type, which may be readily operated under high pressures.

A more specific object of this invention is to provide a valve of the plug type in which a closure member is pulled away from its seat with a direct pull at the same time it is urged laterally in opening the valve.

A further object is to provide a valve in which a closure member will be positively urged against its seat when the valve is closed but will not be urged into contact with any surface except when the valve is closed.

Another object of this invention is to provide such a valve in which the closure member is resiliently urged against its seat when the valve is in closed pisition.

Another object is to provide a valve of the character referred to in which the leading edge of a closure member is urged away from its seat during the closing of the valve.

Other objects and advantages of this invention will become apparent from the following description taken in connection with the accompanying drawings, wherein are set forth certain illustrations embodying this invention.

Figure 1:
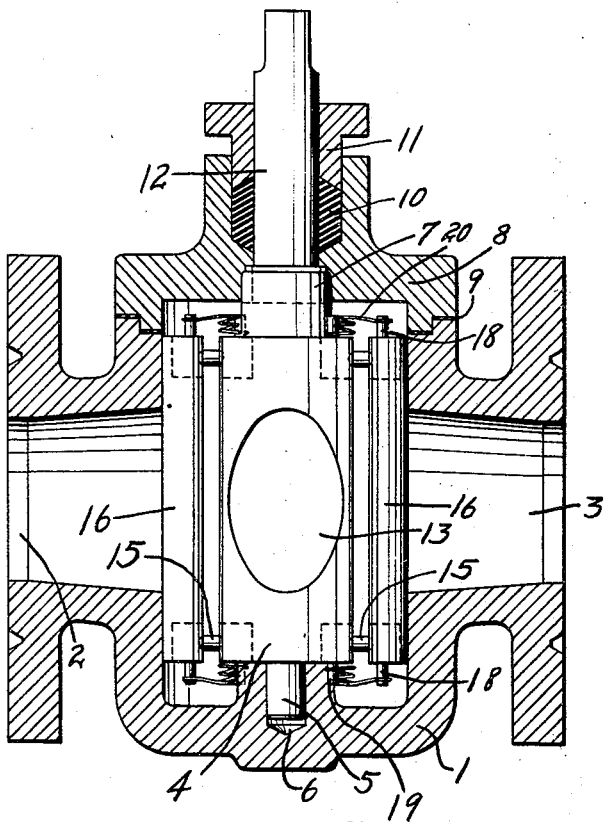
Fig. 1 is a longitudinal section through a valve constructed in accordance with this invention.

Referring first to the forms shown in Figs. 1 to 4 inclusive, the valve body 1 has fluid flow openings 2 and 3 and a transversely extending valve chamber in which is positioned a valve carrier 4. The carrier 4 has a downwardly projecting pin 5, which fits within an opening 6 in the body 1, thus forming a bearing for one end of the carrier.

The opposite end of the carrier is provided with a somewhat larger bearing projection 7, which is journaled within an opening through the bonnet 8, thus providing a bearing for the other end of the carrier. The bonnet 8 is sealed to the body by means of gaskets 9 of any suitable material and is provided with a stuffing box containing a packing 10, which is compressed by means of a gland 11 to form a seal about the stem 12.

The carrier 4 has an opening 13 transversely therethrough, which is adapted to register with the openings 2 and 3 when the valve is opened. This carrier is flattened on two of its opposite sides and in these flattened sides is provided with grooves, which are of circular cross section and of an extent somewhat greater than a half circle. These grooves are adapted to receive the enlargements 14 on the toggle links 15 by which the closure members or segments 16 are mounted on the carrier. The closure members 16 as provided with similar grooves for receiving the enlargements 17 on the outer ends of these toggle links. The toggle links may be in the form of separate short links at each end of each segment as shown at 15 in Fig. 1 or they may be in the form of a web extending the entire length of each segment as shown at 15' in Fig. 7. It will thus be seen that the segments 16 are rockably mounted upon the carrier 4 by means of the toggle links 15 and 15'. Adjacent that edge of each segment, which is the leading edge as the segment is being moved to closed position, each segment is provided with a pin 18 extending from the end thereof. A similar pin 19 is carried on the adjacent end portion of the carrier and connecting these two pins is a spring 20 so tensioned that it tends to draw this leading edge of the segment toward and against the adjacent portion of the carrier.

Figure 7:
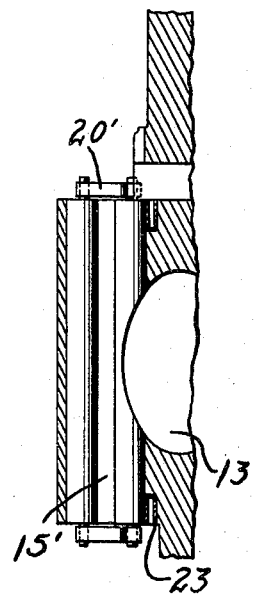
Fig. 7 is a longitudinal cross section taken along the line 7—7 of Fig. 6.
Figure 6:
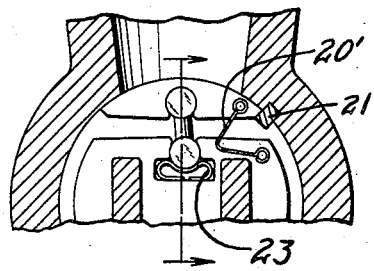
Fig. 6 is a view similar to a portion of Fig. 5 but showing a still further modification.

The spring 20', which is shown in Figs. 6 and 7, is of slightly different form in that it is made of flat material and has only a single bend, but its function is the same; namely, to urge the leading edge of the segment toward the carrier at all times.

Positioned adjacent one edge of each of the openings 2 and 3 is a stop member 21, against which the said leading edge of the segment is adapted to abut in the closing of the valve.

Figure 3:
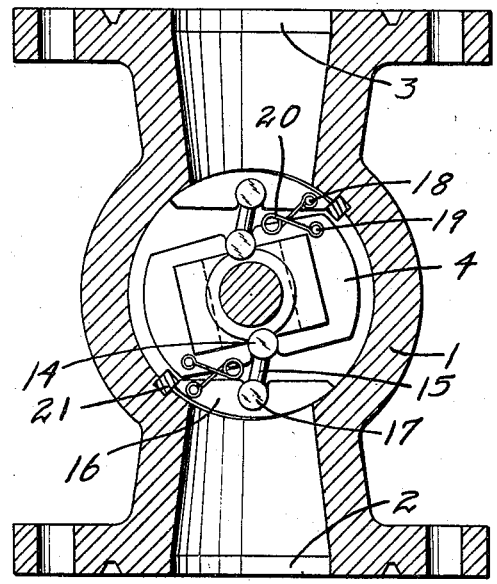
Fig. 3 is a view similar to Fig. 2 but showing the parts as they appear just after the beginning of the valve opening operation.
Figure 4:
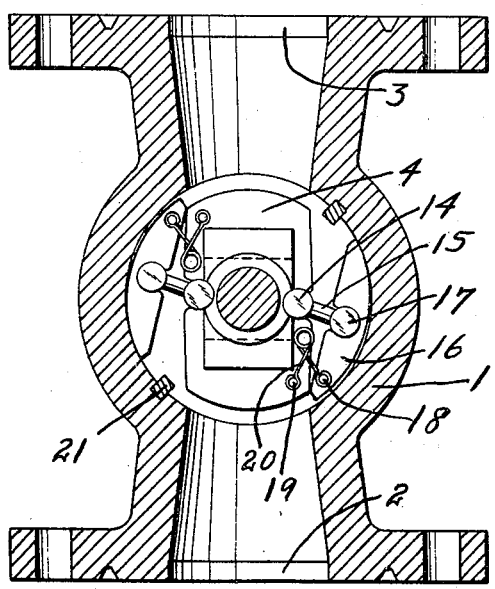
Fig. 4 is a view showing the parts in their open position.
Figure 5:
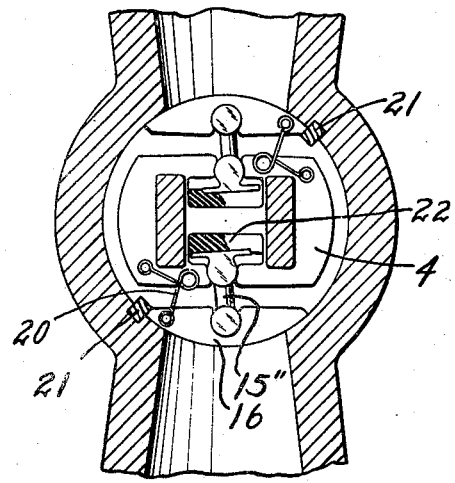
Fig. 5 is a view similar to Figs. 2, 3 and 4 but illustrating a slight modification.

In the forms shown in Figs. 1, 2, 3 and 4, the links 15 are connected to both the carrier and the segment in such a manner that the distance between the carrier and segment is substantially fixed. In Fig. 5, however, the inner end portion of each of the links 15" bears against a block 22 of rubber, or some other suitable resilient material. It will be noted also that the inner end of each link is provided with a flat shoe for bearing upon the rubber block 22. By this arrangement it will be seen that each sigment will at all times be urged resiliently toward its seat when the valve is closed.

Also, in Figs. 6 and 7 there is shown an arrangement in which instead of the resilient block, as shown in Fig. 5, there is a strip of spring metal 23 or the like, which serves the same purpose as the resilient block of Fig. 5.

Figure 2:
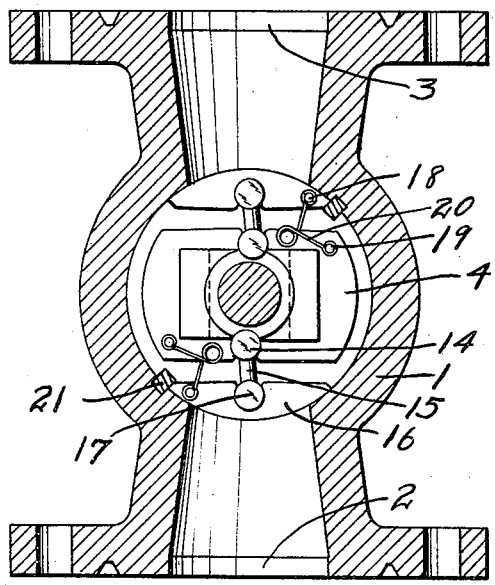
Fig. 2 is a longitudinal section through the same valve at right angles to Fig. 1 and showing the closure members in fully closed position.

The operation of the valve just described is very simple. Referring to Fig. 2, for example, the valve is shown in its closed position with both segments seated against their respective openings. When it is desired to open the valve, the carrier is rotated to the left by turning the stem 12. This action is illustrated in Fig. 3 and it will be seen that by virtue of this turning of the carrier the action of the toggle links 15 is to pull both segments away from their seats at points adjacent the stops 21. The segments take this position partly by virtue of the pulling action on the toggle links in the rotation of the carrier and partly because of the presence of the springs 20. The segments having been lifted away from their respective openings, the friction between these segments and their seats will be greatly reduced and the valve may be readily moved to open position, which is shown in Fig. 4.

When the valve is moved again toward closed position the segments 16 will retain their position with the leading edges drawn away from contact with the inner walls of the valve chambers by the springs 20 until the leading edges of the segments engage the stops 21. When this occurs the segments will, of course, stop rotating with the carrier and further rotation of the carrier will move the toggle links again to the position shown in Fig. 2, where they will hold the respective segments fully seated against their seats.

In the case of the structures shown in Figs. 5, 6 and 7, the resilient members 22 and 23 will serve to constantly urge the segments against their seats.

It will be seen by virtue of the springs 20 and 20' the segments may be moved to their seating position without their leading edges "digging in" and causing too great a frictional resistance, and yet the segments will be positively retracted from their seating position immediately when the opening movement of the valve stem is begun.

A means has thus been provided for accomplishing all the objects and advantages sought by this invention.

Having described my invention, I claim:

1. In a valve, a body having a flow passage therethrough and a valve chamber intersecting said flow passage, a valve carrier rotatably mounted in said chamber, a closure segment adapted to close said flow passage, a link pivotally connected to said carrier and said segment so as to permit said segment to swing away from the inner wall of said chamber and toward said carrier, a spring normally urging toward said carrier the leading edge of said segment as it moves toward closed position, and means on said body to be engaged by said leading edge and stop the same when it reaches a position overlying the opening which it is to close, whereby further movement of said carrier will act through said link to move said segment in a substantially radial direction against its seat.

2. In a valve, a body having a flow passage therethrough and a valve chamber intersecting said flow passage, a valve carrier rotatably mounted in said chamber, a closure segment adapted to close said flow passage, a link pivotally connected to said carrier and said segment so as to permit said segment to swing away from the inner wall of said chamber and toward said carrier, a spring normally urging said segment toward said carrier, and means on said body to be engaged by the leading edge of said segment as it moves toward closed position to stop said segment when it reaches a position overlying the opening which it is to close, whereby further movement of said carrier will act through said link to move said segment in a substantially radial direction against its seat.

3. In a valve, a body having a flow passage therethrough and a valve chamber intersecting said flow passage, a valve carrier rotatably mounted in said chamber, a closure segment adapted to close said flow passage, a link pivotally connected to said carrier and said segment so as to permit said segment to swing about the connection between the link and carrier as a center away from the inner wall of said chamber toward and into engagement with the carrier on one side of the connection between the link and carrier, means constantly urging said segment toward said carrier, and stop means on said body to be engaged by said segment and to stop the same when it reaches a position overlying the opening which it is to close, said engagement between the closure segment and carrier serving to maintain the closure segment in a position to engage the stop means in advance of the carrier reaching its closed position whereby further movement of said carrier will act through said link to move said segment in a substantially radial direction against its seat.

4. In a valve, a body having a flow passage therethrough and a valve chamber intersecting said flow passage, a valve carrier rotatably mounted in said chamber, a closure segment adapted to close said flow passage, a link pivotally connected to said carrier and said segment so as to permit said segment to swing about the connection between the link and carrier as a center away from the inner wall of said chamber and toward and into engagement with the carrier on one side of the connection between the link and carrier, and stop means on said body to be engaged by said segment as it moves toward closed position and stop the same when it reaches a position overlying the opening which it is to close, said engagement between the closure segment and carrier serving to maintain the closure segment in a position to engage the stop means in advance of the carrier reaching its closed position whereby further movement of said carrier will act through said link to move said segment in a substantially radial direction against its seat.

5. In a valve, a body having a flow passage therethrough and a valve chamber intersecting said flow passage, a valve carrier rotatably mounted in said chamber, a closure segment adapted to close said flow passage, means on said carrier and said segment for moving said segment radially when said carrier is rotated with respect to said segment, a spring directly connecting the segment and carrier and constantly urging said segment toward said carrier, and means on said body to be engaged by said segment and stop the same when it reaches a position overlying the opening which it is to close, whereby further movement of said carrier will move said segment in substantially radial direction against its seat.

6. In a valve, a body having a flow passage therethrough and a valve chamber intersecting said flow passage, a valve carrier rotatably mounted in said chamber, a closure segment adapted to close said flow passage, said carrier and segment having on their adjacent surfaces sockets of circular cross section, a link having parts fitted for limited rotation in said sockets and connecting said carrier and said segment so as to permit said segment to swing in an arc about the center of said socket in the carrier away from the inner wall of said chamber toward and into engagement with the carrier on one side of the socket therein, and stop means on said body to be engaged by said segment and stop the same when it reaches a position overlying the opening which it is to close, said engagement between the closure segment and carrier serving to maintain the closure segment in a position to engage the stop means in advance of the carrier reaching its closed position whereby further movement of said carrier will act through said link to move said segment in a substantially radial direction against its seat.

7. In a valve, a body having a flow passage therethrough and a valve chamber intersecting said flow passage, a valve carrier rotatably mounted in said chamber, a closure segment adapted to close said flow passage, cylindrical sockets extending substantially parallel to the axis of said carrier in the adjacent surfaces of said carrier and segment, a link having cylindrical edges fitted in said sockets for limited pivotal movement therein for connecting said carrier and segment while permitting said segment to swing in an arc about the axis of the socket in the carrier as a center away from the inner wall of said chamber toward and into engagement with the carrier on one side of the socket therein and stop means on said body adapted to be engaged by said segment and stop the same when it reaches a position overlying the opening which it is to close, said engagement between the closure segment and carrier serving to maintain the closure segment in a position to engage the stop means in advance of the carrier reaching its closed position whereby further movement of said carrier will act through said link to move said segment in a substantially radial direction against its seat.

8. In a valve, a body having a flow passage therethrough and a valve chamber intersecting said flow passage, a valve carrier rotatably mounted in said chamber, a closure segment adapted to close said flow passage, a link pivotally connected to said carrier and said segment so as to permit said segment to swing away from the inner wall of said chamber and toward said carrier, a spring interposed between the carrier end of said link and said carrier so as to provide a resilient mounting for said link on said carrier, and means on said body to be engaged by said segment and stop the same when it reaches a position overlying the opening which it is to close, whereby further movement of said carrier will act through said link to move said segment in a substantially radial direction against its seat.

9. In a valve, a body having a flow passage therethrough and a valve chamber intersecting said flow passage, a valve carrier rotatably mounted in said chamber, a closure segment adapted to close said flow passage, a link pivotally connected to said carrier and said segment so as to permit said segment to swing away from the inner wall of said chamber and toward said carrier, a rubber body interposed between the carrier end of said link and said carrier so as to provide a resilient mounting for said link on said carrier, and means on said body to be engaged by said segment and stop the same when it reaches a position overlying the opening which it is to close, whereby further movement of said carrier will act through said link to move said segment in a substantially radial direction against its seat.

10. In a valve, a body having a flow passage therethrough and a valve chamber intersecting said flow passage, a valve carrier rotatably mounted in said chamber, a closure segment adapted to close said flow passage, a link pivotally connected to said carrier and said segment so as to permit said segment to swing away from the inner wall of said chamber and toward said carrier, resilient means interposed between the carrier end of said link and said carrier so as to provide a resilient mounting for said link on said carrier, and means on said body to be engaged by said segment and stop the same when it reaches a position overlying the opening which it is to close, whereby further movement of said carrier will act through said link to move said segment in a substantially radial direction against its seat.

11. In a valve, a body having a flow passage therethrough and a valve chamber intersecting said flow passage, a valve carrier rotatably mounted in said chamber, a closure segment adapted to close said flow passage, a link pivotally connected to said carrier and said segment so as to permit said segment to swing away from the inner wall of said chamber and toward said carrier, said link having an enlarged flat part on its end adjacent said carrier, and a rubber member on said carrier between said carrier and said flat part to provide a resilient seat for said link on said carrier, and means on said body to be engaged by said segment and stop the same when it reaches a position overlying the opening which it is to close, whereby further movement of said carrier will act through said link to move said segment in a substantially radial direction against its seat.

CHARLES FRANCIS JOHNSON.